Patented June 4, 1929.

1,716,082

UNITED STATES PATENT OFFICE.

ALFRED E. PARMELEE, OF CARNEYS POINT, NEW JERSEY, ASSIGNOR TO E. I. DU PONT DE NEMOURS & COMPANY, OF WILMINGTON, DELAWARE, A CORPORATION OF DELAWARE.

PRODUCTION OF BETA-NAPHTHOL-1-SULPHONIC ACID.

No Drawing.    Application filed February 20, 1924.  Serial No. 694,013.

This invention relates to the production of beta-naphthol-1-sulphonic acid. More particularly it relates to a method of producing the acid such that not only are high yields obtained but also the mechanical inconveniences, and other difficulties of previous methods are avoided. It is the object of the invention to provide such a method. Stated briefly, the method comprises the sulfonation of beta-naphthol with chlorosulphonic acid in the presence of an inert solvent, particularly ortho-mono-nitro-toluene.

In the production of beta-naphthol-1-sulphonic acid the ordinary practice has been to treat beta-naphthol with 90–93% sulfuric acid at ordinary temperatures. The product of the interaction of beta-naphthol and sulfuric acid is a mixture of the mono-sulphonic acids of beta-naphthol; and the yield of beta-naphthol-1-sulphonic acid is but about 70% of the theoretical. Furthermore, this method has many mechanical inconveniences because of the stiff pasty nature of the reaction product. It is also possible, as mentioned in the literature, to convert beta-naphthol to beta-naphthol-1-sulphonic acid by allowing chlorosulphonic acid to react with a suspension of beta-naphthol in carbon disulfide. But this method is difficult to carry out, unless prohibitively large amounts of carbon disulfide are used, because of the stiffness of the reaction mass which makes impossible a proper mixing of ingredients. Also, not only is the inflammability of carbon disulfide an objectionable feature but also the yield of beta-naphthol-1-sulphonic acid is but 60–70%. By the present method difficulties such as those mentioned are avoided, the reaction is readily controlled, and higher yields and a purer product are obtained, the average yield being 85 to 90% of the theoretical and the product being very pure.

I have now discovered that the disadvantages of both of the previously known methods can be overcome by suspending the beta-naphthol in an inert substance in which the sulphonic acids of beta-naphthol are soluble, such as ortho-mono-nitro-toluene, and then allowing it to be reacted upon by chloro-sulphonic acid. The chloro-sulphonic acid may or may not be diluted with the solvent used. It is to be noted that the beta-naphthol-1-sulphonic acid being soluble in the reaction medium facilitates the handling of the sulfonation mixture and guards against a local high concentration of chloro-sulphonic acid during its addition.

The use of chloro-sulphonic acid reduces the formation of isomeric sulphonic acids to a minimum. Furthermore, the sulphonic acids of beta-naphthol being soluble in the nitro body, the reaction mass is mobile at all times and satisfactory mixing is obtained.

As examples of the use of chloro-sulphonic acid in sulfonating beta-naphthol in the presence of a solvent for the sulphonic acid formed, the following are given, without restricting the invention thereto:—

(1) Into any suitable pot provided with a vent for the escape of hydrogen chloride, means for the slow regular introduction of chloro-sulphonic acid, suitable cooling provisions, and mechanical agitation, are charged 144 grams of beta-naphthol and 500 grams of ortho-nitro-toluene. The resulting mixture is cooled to 0° C. and there is then run in 140 grams of chloro-sulphonic acid at such a rate that the addition of acid requires about three hours. The charge is then stirred for one to three hours. The temperature should be maintained below 10° C. during the whole time.

At the completion of the sulfonation the reaction mass is drowned in one litre of water and the nitro-toluene separated from the aqueous solution of the naphthol sulphonic acids. This aqueous solution is then neutralized with an alkali carbonate or hydroxide such as potassium carbonate. The potassium salt of beta-naphthol-1-sulphonic acid is salted from solution with potassium chloride and is filtered off.

(2) One hundred and forty-four grams of beta-naphthol and 400 grams of ortho-nitro-toluene are mixed in the pot and the mixture cooled to 0° C. There is then run in a solution of 140 grams of chloro-sulphonic acid and 140 grams of ortho-nitro-toluene at such a rate that the addition of the acid requires about three hours. The charge is stirred one to three hours. The temperature is maintained below 10° C. throughout the whole of the time. When the sulfonation is complete the sulfonation mass is drowned in one litre of water and is worked up as indicated in Example "1".

I claim:
1. The process of making beta-naphthol-

1-sulphonic acid which comprises the sulfonating of beta-naphthol, suspended in ortho-nitro-toluene, with chloro-sulphonic acid, the temperature of the reaction mass being kept below 10° C. during the sulphonation.

2. The process of making beta-naphthol-1-sulphonic acid which comprises sulfonating beta-naphthol, suspended in ortho-nitro-toluene, with a solution of chloro-sulphonic acid in ortho-nitro-toluene, the temperature of the reaction being kept below 10° C. during the sulphonation.

3. The process of making beta-naphthol-1-sulphonic acid which comprises sulfonating beta-naphtol, suspended in ortho-nitro-toluene, with chloro-sulphonic acid, the temperature of the reaction mass being kept below 10° C. during the sulphonation, drowning the sulfonation mass in water, adding a neutralizing alkali compound, and salting out the beta-naphthol-1-sulphonic acid in the form of its potassium salt.

4. The process of making beta-naphthol-1-sulphonic acid which comprises sulfonating beta-naphthol, suspended in ortho-nitro-toluene, with chloro-sulphonic acid, the temperature of the reaction mass being kept below 10° C. during the sulphonation, drowning the sulfonation mass in water, adding a neutralizing potassium compound and salting out the potassium beta-naphthol-1-sulfonate.

In testimony whereof I affix my signature.

ALFRED E. PARMELEE.